Figure 1:
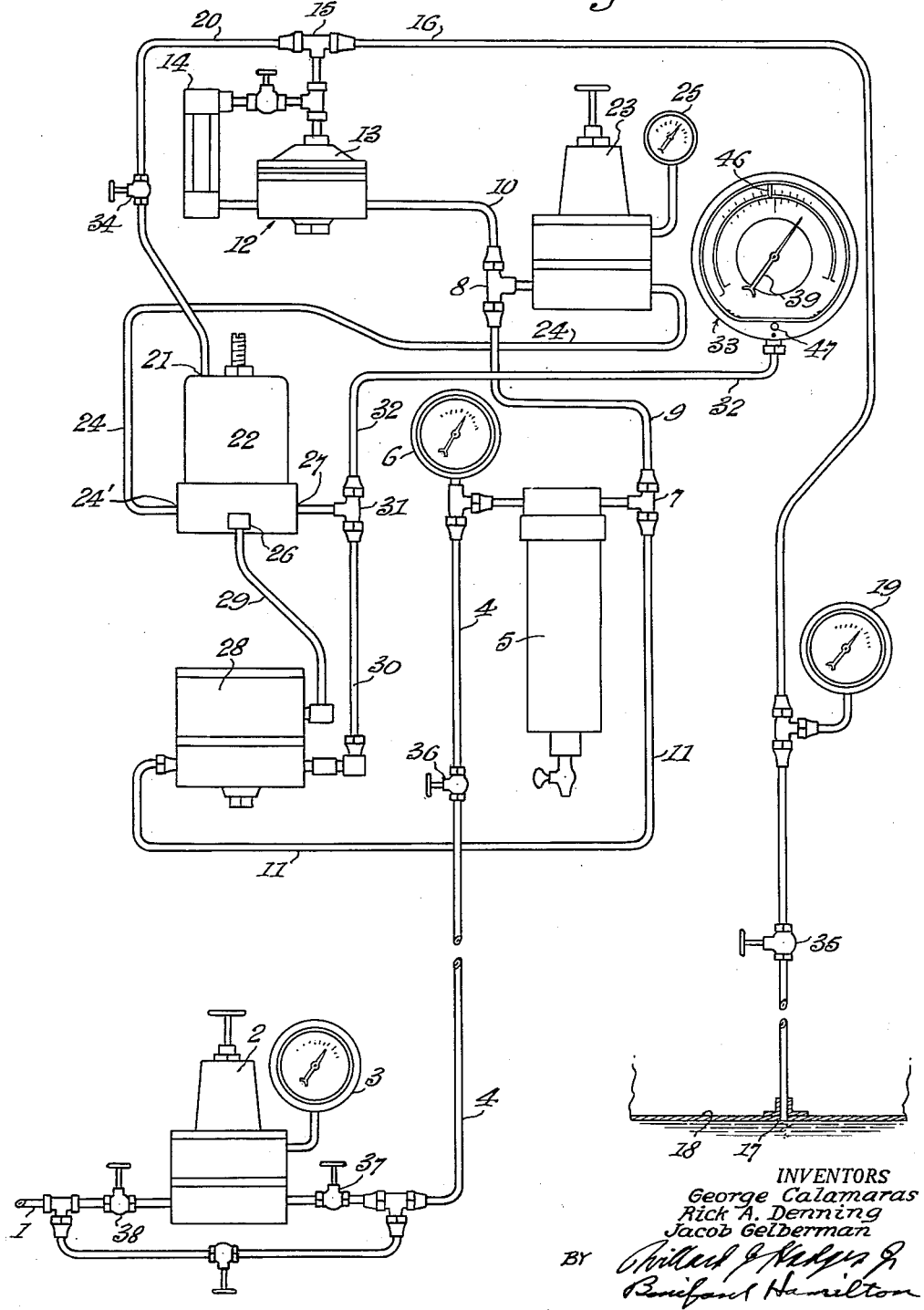

Nov. 12, 1963  G. CALAMARAS ETAL  3,110,181
SYSTEM FOR MEASUREMENT OF BULK CARGO ON VESSELS
Filed Aug. 28, 1958  2 Sheets-Sheet 2

INVENTORS
George Calamaras
Rick A. Denning
Jacob Gelberman
BY
ATTORNEYS

United States Patent Office 3,110,181
Patented Nov. 12, 1963

3,110,181
SYSTEM FOR MEASUREMENT OF BULK CARGO ON VESSELS
George Calamaras, 127 Alpine Drive, Closter, N.J.; Rick A. Denning, 225 W. 232nd St., Bronx 63, N.Y.; and Jacob Gelberman, 307 Redmont Road, West Hempstead, N.Y.
Filed Aug. 28, 1958, Ser. No. 757,887
6 Claims. (Cl. 73—302)
(Granted under Title 35, U.S. Code (1952), sec. 266)

The invention described herein may be manufactured and used by or for the Government for governmental purposes without the payment of any royalty.

The present invention relates to improvements in the measurement of loads on vessels, particularly hopper dredges, and to improvements in processes for determination of peak efficient load of a hopper dredge.

Various methods have been used for measurement of bulk cargo in a ship through use of displacement; as for example, by the use of draft markings on the exterior of the hull or through the use of internal draft gauges. Similarly, the use of draft measurement in the determination of hopper dredge loads has been suggested. These previous disclosures, however, generally relate to the determination of the maximum load that the vessel can carry or the measurement of a standard bulk cargo (a bulk cargo of unvarying known density) and are not readily adaptable to use with bulk cargo of a nature that varies from load to load or, for that matter, within portions of the same load as does dredged material.

The art of dredging involves, among other things, tabulation of quantities and locations of dredged material against surveys of the channel bottom so as to maintain current information that will prolong the interval between complete surveys. This procedure requires an accurate measurement of the solids and semi-solids removed, calculated in terms of volume of the material before removal or in situ, in addition to accurate location of the removal site. Another major problem in the use of hopper dredges is involved in the determination of the most efficient time to cease pumping. This problem arises from the standard procedue of pumping bottom mud and silt into hoppers that are partially filled with water and continuing the pumping as the water originally contained in the hopper and the additional water pumped into the hopper with the borrow washes overboard through discharge ports. As water accompanied by some of the fines are discharged overboard, the heavier material settles into the hoppers. As the level of the precipitated material in the hoppers approaches the level of the discharge scuppers, the depth and volume of the mixture of water and unprecipitated dredged material decrease. Maintenance of a constant pumping rate causes this decreased volume of mixture to be replaced in ever diminishing time internals, in turn causing an ever increasing amount of the solids to be washed overboard rather than to be precipitated. Additionally, the greater mixture turnover rate creates more turbulence impairing the precipitation. The net result is that the portion of the dredged solids discharged through the scuppers constantly increases and, just before the hoppers are filled, approaches a condition of equilibrium in which the solids discharged equals the solids dredged. An incompletely loaded hopper dredge resulting from premature cessation of dredging operations causes an inefficiency in ratio of solids carried to operating expenses. Conversely, an inefficient ratio may be created by the excessive operating time necessary to completely fill the hoppers with precipitated dredged material. The desired efficiencies can be obtained only by selection of the proper time to cease dredging and to proceed to the dumping area.

Accordingly, an important object of the invention is to provide a mechanism to indicate through meters or recorders at any particular time a fairly accurate measurement of bulk cargo on board a vessel.

Another important object of the invention is to provide a measurement device to indicate bulk cargo on board a vessel in such a way that the loading rate during any time interval may be recorded or observed.

Another object of the invention is to provide a bulk cargo meausrement system particularly adapted to a hopper dredge to indicate the amount of water or dredged solids at any particular time.

Another object of the invention is to provide a bulk cargo meausring system particularly adapted to a hopper dredge which will indicate a diminishing rate of retention of dredged solids.

A still further object of the invention is to provide a method for the continuous measurement of on-board bulk cargo of vessels and the registering of a change in loading rate.

Other objectives and advantages of the invention will be apparent as the description proceeds and the features of novelty will be pointed out in particularity in the appended claims.

Briefly, in accordance with this invention, there is provided a bulk cargo measuring system for vessels which through meausrement of the draft of a vessel and correction of that meausrement to reflect the excess of draft over an unloaded or base condition in terms of volume of cargo provides both a meausrement of the cargo and an indication of the rate of change of cargo. The disclosed specific embodiment adapted for use with a hopper dredge is a fluid pressure system including a source of standard fluid pressure, a pressure regulator and system for providing fluid pressure representative of the draft of the vessel in an unloaded condition and a pressure regulator and system which furnishes fluid pressure representative of the draft of the vessel at any particular time, a differential pressure sensing and amplification system which provides an amplified pressure proportional to the difference between the two pressures based on draft of the vessel and a meter or recording device operated by the amplified pressure differential to indicate the amount of cargo and the rate of change of cargo measured in cargo units.

In the accompanying drawings illustrating a preferred embodiment of the improvements comprising the invention—

Figure 2:
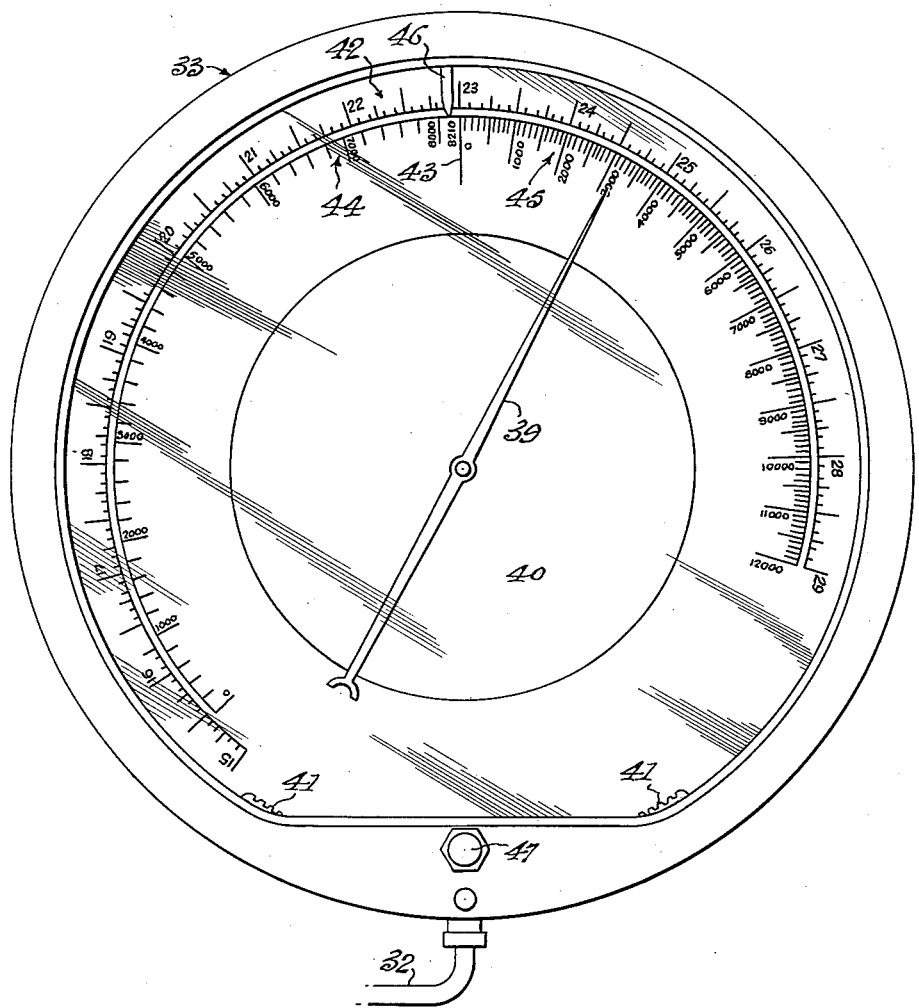

FIG. 1 is a schematic diagram of a fluid pressure system for measurement of bulk cargo on a vessel; and
FIG. 2 is an enlarged view of the meter of FIG. 1.

More specifically, the schematic drawing is of an apparatus incorporating commercially available fluid pressure devices into a novel system to indicate the bulk cargo and rate of change of that cargo on a vessel which is particularly adapted for use on a hopper dredge during dredging operations. In the system illustrated, compressed air from a source such as the vessel's central system is provided through source pipe 1 to an adjustable regulator 2 which supplies a selected standard pressure, 30 pounds per square inch in the preferred embodiment, measured by the attached pressure gauge 3 to supply pipe 4. Supply pipe 4 conducting the standard pressure air to filter 5 may be provided with additional monitor gauge 6 in the pilot house of the vessel. The standard air in supply pipe 4 is cleaned by filter 5 and routed by T's 7 and 8 and standard pressure conduits 9, 10, and 11 to several pressure responsive devices.

One of the pressure responsive devices to which standard air is supplied by conduits 9 and 10 is the constant flow controller 12 which includes constant differential relay 13 and flow rater 14 as components. Constant flow controller 12 with its commercially available components 13 and 14, provides a constant volume of air with a pressure ($P_1$) that varies as required to overcome any opposition. In this instance the rate of flow is one cubic foot per hour through T 15 into purge line 16. Purge line 16 extends through the ship's hull near the keel as indicated by port 17 in hull 18. Because the constant controller 12 is providing a flow of one cubic foot or air per hour through purge line 16 and bubbling air from port 17 at that same slow rate, the pressure within purge line 16 at any particular time is not only proportional to the depth of port 17 below the surface of the water, but is an accurate measurement of the draft of the vessel at any particular time. This same variable pressure developed by constant flow controller 12 is supplied from T 15 through pipe 20 to the high pressure connection 21 of transmitter 22 for utilization as a gross measurement of the loaded condition of the vessel. Gauge 19 in purge line 16 constantly registering the pressure ($P_1$) representing the draft of the vessel is used as a basis of comparison and an aid to checking operation of the system.

The filtered standard pressure air is also supplied through conduit 9 and T 8 to suppression pressure regulator 23 which is adjusted to feed a constant predetermined pressure ($P_2$) into pipe 24 against a dead end service. This predetermined pressure ($P_2$) as registered by gauge 25 is selected to represent the unloaded draft of the vessel, which is to say, it is a pressure measurement of the weight of the vessel when the vessel is equipped for service except for cargo, as will be hereinafter described. Pressure ($P_2$) is supplied through pipe 24 to the low pressure connection 24' of transmitter 22 which is also provided with a constant supply tap 26 and an amplified differential pressure tap 27. Transmitter 22 is a differential pressure transmitter, a commercially available pressure responsive device for establishing and transmitting a fluid pressure that is equal to or proportional to the difference between two other fluid pressures. A commercially available integrated component serving the functions of both transmitter 22 and pilot valve 28 may be used if desired without in any way altering the concept of this invention. In this instance, transmitter 22 establishes a differential pressure equal to the difference between pressure ($P_1$) entering through high pressure connection 21 and pressure ($P_2$) entering the transmitter through low pressure connection 24' which may be referred to as ($P_1-P_2$). When the transmitter 22 is used in combination with a pilot valve 28 connected by pipe 29 to constant supply tap 26 of the transmitter and by pipe 30 to T 31 so as to communicate with the amplified differential pressure tap 27 of the transmitter, the differential pressure ($P_1-P_2$) established by the transmitter is modified by amplification by a factor "A" so as to be unequal to, but linearly proportional to, the difference ($P_1-P_2$) between pressures in pipes 20 and 24. Therefore, the pressure produced in pipe 32 is best represented as $A(P_1-P_2)$. Pilot valve 28 is a commercially available equipment which produces amplification of the differential pressure ($P_1-P_2$) through use of the standard pressure air of the system supplied through conduit 11 from the filter 5. Pipe 32 conveys the amplified differential pressure $A(P_1-P_2)$ from the transmitter to meter 33 where it operates indicator 39. A recording instrument may be used in place of meter 33.

The system is also supplied with valves 34, 35, 36, 37, and 38. Valve 34 may be adjusted to prevent pressure surges in purge line 16 and pipe 20 from reaching transmitter 22, therefore having a damping effect on the high pressure side of transmitter 22 and on the resulting fluctuations of the amplified differential pressure. Valve 35 may be used in rough seas to shut off the system so as to prevent surging of pressure from damaging the components. Valves 36, 37, and 38 may be used to shut off various parts of the system or to adjust the supply of standard pressure air.

Operation of the system requires pre-adjustment of suppression pressure regulator 23 to create pressure ($P_2$) in pipe 24 representative of the draft of the fueled, watered, and otherwise provisioned, but unloaded, vessel so that pressure ($P_2$) may be used to represent zero cargo on board. This calibration may be effected in either of two ways. One method requires provisioning of the vessel, emptying the hoppers of all sludge and seawater and the adjustment of suppression pressure regulator 23 so as to equate pressure ($P_2$) to pressure ($P_1$) which would, as previously described, represent the value desired. The second and more feasible method is accomplished by adjusting regulator 23 so that pressure ($P_2$) as registered by gauge 25 is a pounds per square inch equivalent of the pressure of a column of water equal to the draft of the provisioned but unloaded vessel.

Meter 33 for ordinary cargo operation is calibrated with two scales, one being the draft of the vessel, the other being measurement of the cargo in whatever unit is appropriate.

The foregoing explanation is as applicable to a hopper dredge as it is to an ordinary cargo vessel. Application of the system to a hopper dredge presents a peculiar problem because of the fact that opening of the hopper floors of the dredge to dump dredged material permits sea water to flow up into the hoppers to a depth comparable to the draft of the vessel; closing the hopper floors after unloading causes a considerable volume of water to be retained inside the hoppers. The vessel on dumping its cargo of dredgings will not return to unloaded draft but will maintain a greater draft as determined by the amount of retained sea water. For this reason it is most feasible to calibrate meter 33 so that the zero meter reading indicating no cargo on board represents the fueled and provisioned vessel without dredgings but including the sea water retained in the hoppers. For this reason the meter 33 used with any hopper dredge must have a scale that is tailored to that particular vessel.

Meter 33 is a precision pressure gauge of commercial design having a pointer or indicator 39. The dial 40 is mounted for rotation and provided with a rack 41 which when meshed with a pinion gear journaled in the front casing and having thumb nut 47 enables rotation of the dial for scale correction. The dial is provided with two scales, the exterior scale 42 indicating draft of the vessel while the inner scale is divided at center or zero line 43 into left inner scale 44 and right inner scale 45. Zero line 43 represents the fully fueled, watered, and provisioned draft of the dredge with the hoppers carrying sea water. Scale 44 is calibrated from the zero line to the minimum draft of the dredge in decreasing volume in cubic yards of sea water in the hoppers. Scale 45 reads in volume of dredged material precipitated or suspended in sea water in terms of cubic yards of material of 1600 grams per liter density. Reference pointer 46 is attached to the frame of the meter and does not rotate with the dial so that it may be used as a point of reference in making adjustments by the rotation of the dial.

To facilitate explanation, the meter 33 best illustrated in FIG. 2 is scaled to a particular vessel. This vessel, a hopper dredge, has a provisioned but unloaded draft of 15 feet 6 inches. In this condition the vessel would contain a normal load of fuel and other supplies but would have the hoppers nearly dry. The same vessel, however, after dumping a load of dredge material and closing the hopper doors retains quite a bit of water. If the hoppers were to be pumped full of water after a dumping operation, the vessel would contain 8,000 cubic yards of sea water and have a draft of 23 feet. Accordingly, the zero scale of cargo coincides with a 23 foot draft and the cargo scale to the left side of the zero is calibrated in decreasing volumes of water in cubic yards from 8,210 to zero. This will permit the meter indicator to register the number of cubic yards of sea water in the hoppers when the vessel is not carrying dredged material. The right side of the cargo scale is calibrated from zero through 12,000 cubic yards of dredged material. Since dredged material fluctuates considerably in density, the cargo scale is calibrated on the basis of cubic yards of an average density of material, in this case a density of 1,600 grams per liter.

Pumping of dredged material into the hoppers during the dredging operation causes a mixture of dredged material and sea water to be added to the sea water already in the hoppers, permitting the dredged material to precipitate to the bottom of the hoppers while the level of the mixture in the hoppers rises toward the discharge ports. When the level of the mixture reaches the discharge ports, overflow commences. The overflow through the discharge ports is mostly sea water but includes some fines of the dredged material that are discharged. After overflow commences, precipitation of dredged material to the bottom of the hopper is accompanied by an overboard discharge of an equivalent volume of water. Therefore, the indicator on the meter in reflecting an increase in the draft of the vessel which is representative of the relationship of the density of the dredged material to the density of the sea water originally contained in the hoppers, registers the mass of dredged material converted to volume in cubic yards at the standard density of 1,600 grams per liter. Comparison testing of the actual density of the material gives a figure from which the actual cubic yard measurement of the dredged material on board may be calculated.

Not only does meter 33, with the scale as explained, indicate a volume of standard density material dredged which may be converted to an actual bulk measurement of dredged material, but timing of the movement of the indicator establishes a rate of loading of the dredged material. This loading rate may be referred to in cubic yards per time interval. By knowledge gained in operating a particular dredge, a rule of diminishing return may be established that will indicate the most efficacious time to cease loading. This time, occurring before a status of equilibrium between dredged material and overflow is reached, is determined by experience gained by analysis of costs and loading experience so as to balance the relative inefficiencies of prospective losses due to equilibrium against prospective losses due to short cargo.

Reference pointer 46 of meter 33 may be used in the fine adjustment of the meter to correct for changes of draft occurring as a result of variations in the amount of fuel, fresh water, and other supplies on board the dredge. As previously explained, the dial 40 may be rotated by operation of thumb nut 47 which by means of a pinion gear, not shown, meshed with rack 41 will cause the dial to rotate about its central pivot point within the framework of the dial itself. Rotation of the dial in this manner will cause the scales to move under both the meter indicator 39 and the reference pointer 46. Since the scale on the dial was calibrated to fit the dredge in a fueled and supplied condition, the indicator 39 will read a draft of less than 23 feet when the dredge is running short of fuel but contains a maximum amount of sea water in the hoppers to correspond with its draft. If the hoppers starting from this condition were then to be filled with dredged material, the hoppers would actually contain much more dredged material than the indicator would show. Adjustment may be made for this condition by rotating the dial to cause zero line 43 to come directly under indicator 39 even though the true draft of the vessel may be only 22 feet 10 inches. Therefore, subsequent loading of dredged material into the hoppers may continue to be read directly on scale 45. Rotation of the dial, however, causes the reference pointer 46 to indicate a different draft reading. This draft reading does not indicate a draft of the vessel in any particular condition but does indicate the amount of correction of draft made as represented by the difference between 23 feet and the reading of pointer 46. In this way the meter may be calibrated so as to read directly in cubic yards of dredged material in the hoppers even though the indicator 39 would be indicating an incorrect draft of the vessel, which incorrect draft reading may be corrected by the addition or subtraction of the difference between 23 feet and the draft indicated by reference pointer 46.

Although the above descriptions have been directed to the use of the fluid pressure system of cargo measurement on a hopper dredge, it must be understood that the same system can be applied equally as well to any cargo vessel with only slight modification of the scale of the meter 33 without deviation from the spirit of the invention.

We claim:

1. A cargo measuring system for a vessel comprising a fluid pressure system including a source of fluid under pressure, a suppression pressure regulator operated by the source pressure for continuous automatic maintenance of a predetermined pressure representative of the unladened draft of the vessel, a constant flow pressure regulator operated by the source pressure and acting against the pressure of the fluid medium supporting the vessel at a point in fixed relation to the hull of the vessel for automatically producing a variable pressure constantly representing the draft of the vessel, a pressure differential transmitter responsive to said predetermined pressure and said variable pressure for establishing a differential pressure linearly proportional to the difference between said variable pressure representing the draft and said predetermined pressure representative of the unladened draft, and a meter operated by said differential pressure, said meter being calibrated in cargo units, and having a sliding reference point for calibration based upon an actual draft norm of the vessel and with which reference point said constant flow variable pressure regulator can be coordinated.

2. A cargo measuring system for a vessel comprising a fluid pressure system including a source of fluid under pressure, a suppression pressure regulator fed by the source of fluid under pressure continuously and automatically maintaining a predetermined fluid pressure representative of the unladened draft of the vessel, a constant flow pressure regulator also fed by the source of fluid under pressure and acting against the pressure of the fluid medium supporting the vessel at a point in fixed relation to the hull of the vessel automatically producing a variable pressure constantly representing the draft of the vessel, a pressure differential transmitter attached in pressure communication with the source of fluid under pressure and to both said predetermined fluid pressure and said variable pressure establishing a differential pressure linearly proportional to the difference between said variable pressure representing the draft at any particular time and said predetermined pressure representative of the unladen draft, and a meter in communication with and operated by said differential pressure, said meter being calibrated in cargo units, and having a sliding reference point for calibration based upon an actual draft norm of the vessel and with which reference point said constant flow variable pressure regulator can be coordinated.

3. A cargo measuring system for a vessel comprising a source of fluid pressure, a pressure regulator connected to said fluid pressure source for maintaining a constant pressure supply, a suppression pressure regulator having the input thereof connected to said constant pressure supply for continuously and automatically maintaining a predetermined pressure output correlated to the unladened draft of the vessel, a constant flow pressure regulator having the input thereof connected to said constant pressure supply and producing at the output thereof by acting against the pressure of the fluid medium supporting the vessel at a point in fixed relation to the hull of the vessel a variable pressure constantly correlated to the ladened draft of the vessel, a pressure differential transmitter having the input thereof connected to said constant pressure supply, to the output of said constant flow pressure regulator and to the predetermined pressure output of said suppression pressure regulator, said pressure differential transmitter establishing a differential pressure linearly proportional to the difference between said variable pressure correlated to the ladened draft of the vessel and the predetermined pressure correlated to the unladened draft of the vessel and a meter calibrated in cargo units of predetermined density connected to the output of said differential pressure transmitter, said meter having a sliding reference point for calibration based upon an actual draft norm of the vessel and with which reference point said constant flow variable pressure regulator can be coordinated.

4. A cargo measuring system for a vessel comprising a fluid pressure system including a source of fluid under pressure, a pressure regulator communicating with the source of fluid and producing a standard fluid pressure, a standard pressure conduit supplied with the standard pressure fluid from the pressure regulator, a suppression pressure regulator connected to the standard pressure conduit, said suppression pressure regulator continuously and automatically providing an adjustable fluid pressure to a suppression pressure conduit, said adjustable pressure being adjusted so as to represent the draft of the unladen vessel, an automatic pressure regulator and constant flow controller also attached to the standard pressure conduit and automatically providing a constant flow of fluid at a variable pressure to a variable pressure conduit, said variable pressure conduit being vented to the fluid medium supporting the vessel at approximately a point of maximum draft of the vessel, a pressure differential transmitter attached to both the suppression pressure conduit and the variable pressure conduit, a transmitter pilot valve attached to the standard pressure conduit, a control pressure conduit interconnecting the differential pressure transmitter and the transmitter pilot valve, a differential pressure conduit interconnecting the transmitter pilot valve and the differential pressure transmitter, and a fluid pressure responsive meter attached to the differential pressure conduit for actuation by pressure created in the differential pressure conduit by the differential pressure transmitter and the transmitter pilot valve, whereby the differential pressure transmitter in cooperation with the transmitter pilot valve will create in the differential pressure conduit a differential pressure proportional to the difference between said variable and suppression pressures, said meter having a sliding reference point for calibration based upon an actual draft norm of the vessel and with which reference point said constant flow variable pressure regulator can be coordinated.

5. A cargo measuring system for a vessel comprising a fluid pressure system including a source of fluid under pressure, a master pressure regulator communicating with the source of fluid and producing a standard fluid pressure, a standard pressure conduit supplied with the standard pressure fluid from the pressure regulator, a suppression pressure regulator connected to the standard pressure conduit, said suppression pressure regulator continuously and automatically providing an adjustable fluid pressure to a suppression pressure conduit, said adjustable pressure being adjusted so as to represent the draft of the vessel in unladened condition, an automatic pressure regulator and constant flow controller also attached to the standard pressure conduit and automatically providing a constant flow variable pressure fluid to a variable pressure conduit, said variable pressure conduit being vented to the fluid medium supporting the vessel at approximately a point of maximum draft of the vessel whereby said variable pressure is responsive to and dependent on the draft of the vessel, a pressure differential transmitter connected to the suppression pressure conduit and the variable pressure conduit, a transmitter pilot valve attached to the standard pressure conduit, a control pressure conduit interconnecting the differential pressure transmitter and the transmitter pilot valve, a differential pressure conduit interconnecting the transmitter pilot valve and the differential pressure transmitter, and a fluid pressure responsive meter attached to the differential pressure conduit for actuation by pressures created by the differential pressure transmitter and the transmitter pilot valve whereby the differential pressure transmitter in cooperation with the transmitter pilot valve will create in the differential pressure conduit a differential pressure proportional to the difference between said variable and suppression pressures, said meter having a sliding reference point for calibration based upon an actual draft norm of the vessel and with which reference point said constant flow variable pressure regulator can be coordinated.

6. A net cargo measuring system for a hopper dredge vessel comprising a source of fluid under pressure, a suppression pressure regulator having the input thereof connected to said source of fluid under pressure for continuously automatically maintaining a predetermined pressure output correlated to the provisioned but unladened draft of the dredge, a constant flow pressure regulator having the input thereof connected to said source of fluid under pressure and producing at the output thereof by action against the pressure of the fluid medium supporting the vessel at a point in fixed relation to the hull of the vessel, a variable pressure constantly and automatically correlated to the ladened draft of the dredge, a pressure differential transmitter having the input thereof connected to said source of fluid under pressure, to the output of said constant flow pressure regulator, and to the predetermined pressure output of said suppression pressure regulator, said pressure differential transmitter creating and transmitting a differential pressure which is linearly proportional to the difference between said variable pressure correlated to the laden draft of the dredge, and said predetermined pressure correlated to the provisioned but unladened draft of the dredge, and a meter calibrated in draft of vessel, hopper content of water and net cargo of a predetermined density in the hoppers, said meter having a sliding reference point for calibration based upon an actual draft norm of the vessel and with which reference point said constant flow variable pressure regulator can be coordinated, whereby said meter will at any time indicate the content of water and net cargo of the hoppers of the dredge along with the draft of the dredge and provide a visual means for measurement of the time rate of retention of solids dredged and pumped into the dredge.

References Cited in the file of this patent

UNITED STATES PATENTS

| | | |
|---|---|---|
| 922,933 | Meno | May 25, 1909 |
| 1,131,412 | Parks | Mar. 9, 1915 |
| 1,931,274 | Thomas | Oct. 17, 1933 |
| 2,265,114 | Hartley | Dec. 2, 1941 |
| 2,288,505 | Wetteland | June 30, 1942 |
| 2,312,201 | Thompson et al. | Feb. 23, 1943 |
| 2,398,958 | Pellettere | Apr. 23, 1946 |
| 2,613,535 | Born | Oct. 14, 1952 |

FOREIGN PATENTS

| | | |
|---|---|---|
| 1,027,076 | France | Feb. 11, 1953 |